United States Patent
Rudrapatna

(10) Patent No.: US 9,414,357 B2
(45) Date of Patent: Aug. 9, 2016

(54) METHODS AND DEVICES FOR OBTAINING A SINGLE FREQUENCY NETWORK IN A NETWORK MULTI-INPUT MULTI-OUTPUT COMMUNICATIONS SYSTEM

(71) Applicant: Alcatel-Lucent USA Inc., Murray Hill, NJ (US)

(72) Inventor: Ashok N. Rudrapatna, Basking Ridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 114 days.

(21) Appl. No.: 13/864,814

(22) Filed: Apr. 17, 2013

(65) Prior Publication Data

US 2014/0313964 A1     Oct. 23, 2014

(51) Int. Cl.
    *H04W 72/00*     (2009.01)
    *H04L 12/18*     (2006.01)
    *H04W 4/06*     (2009.01)
    *H04W 56/00*     (2009.01)

(52) U.S. Cl.
    CPC ........... *H04W 72/005* (2013.01); *H04L 12/189* (2013.01); *H04W 4/06* (2013.01); *H04W 56/0015* (2013.01); *H04W 56/0045* (2013.01)

(58) Field of Classification Search
CPC .... H04W 72/005; H04W 56/001; H04W 4/06
See application file for complete search history.

(56) References Cited

U.S. PATENT DOCUMENTS

| | | | |
|---|---|---|---|
| 2005/0201407 A1 | 9/2005 | Kim et al. | |
| 2007/0281722 A1* | 12/2007 | Gao | ............................... 455/518 |
| 2008/0146213 A1* | 6/2008 | Kim | .................... H04L 12/1881 455/422.1 |
| 2009/0279529 A1* | 11/2009 | Hamalainen et al. | ......... 370/350 |
| 2011/0188480 A1 | 8/2011 | Takagi | |
| 2012/0213145 A1* | 8/2012 | Aminaka | ............. H04B 7/2606 370/312 |

FOREIGN PATENT DOCUMENTS

| | | |
|---|---|---|
| EP | 1991013 A1 | 11/2008 |
| EP | 2339892 A1 | 6/2011 |

OTHER PUBLICATIONS

International Search Report (PCT/ISA/210) dated Jul. 2, 2014 for corresponding International Application No. PCT/US2014/034075.
Written Opinion of the International Searching Authority (PCT/ISA/237) dated Jul. 2, 2014 for corresponding International Application No. PCT/US2014/034075.

* cited by examiner

*Primary Examiner* — Anez Ebrahim
(74) *Attorney, Agent, or Firm* — Harness, Dickey & Pierce, P.L.C.

(57) ABSTRACT

A method for a communications network includes receiving, by a network controller, broadcast content from at least one content source. The method includes synchronizing, by the network controller, with at least a first and second base station. The at least first and second base stations are associated with the network controller. The method includes transmitting, by the network controller, the broadcast content to the at least first and second base stations based on the synchronization such that the broadcast content is transmitted from the at least first and second base stations at desired times.

14 Claims, 5 Drawing Sheets

METHODS AND DEVICES FOR OBTAINING A SINGLE FREQUENCY NETWORK IN A NETWORK MULTI-INPUT MULTI-OUTPUT COMMUNICATIONS SYSTEM

BACKGROUND

Most 3G and 4G wireless systems support broadcast services (e.g., evolved multimedia broadcast multicast services (eMBMS) in Long Term Evolution (LTE) and broadcast, multicast services (BCMSCS) in the High Rate Packet Data (HRPD) system, also known as the Evolved Data Optimized (EVDO) system). These broadcast services along with digital video broadcast (DVB) and its variants DVB-Terrestrial (DVB-T), DVB-Satellite services to Handhelds (DVB-SH), etc. rely on orthogonal frequency division multiplexing (OFDM) air interface technology, wherein identical broadcast signals are transmitted from multiple base stations (BSs). For example, FIG. 1 is a wireless system according to the conventional art, wherein multiple base stations 1-201, 1-202, and 1-203 broadcast content (e.g., audio/video content) signals in a synchronized manner to user equipment UE 1-101 to achieve what is referred to as a single frequency network (SFN).

The performance of such a scheme depends on tight synchronization across the base stations participating in the SFN operation. In FIG. 1, physical layer synchronization entity (PLSE) 1-501 provides synchronization to base stations 1-201, 1-202, and 1-203, which are supporting multicast broadcast services (MBS). The desired synchronization may be at multiple levels: 1) at the physical level (provided by PLSE 1-501 and the associated links to the base stations 1-201, 1-202, and 1-203); 2) at the resource establishment level; and 3) at the applications level (e.g., using internet protocol multicast routing protocol (IMRP) over a backhaul network). However, even if PLSE 1-501 is able to achieve synchronization between baseband units (BBU) of each base station (a BBU is the device that controls radio functions of a base station), accurate synchronization between the transmit antennas of each base station is a major challenge because the timing differences between the BBU and antennas may be different for each base station. Thus, these so-called intra-base station timing differences (i.e., the different timing between the BBU and antenna of a base station) affect the overall synchronization of base stations in the conventional system of FIG. 1.

Additionally, as shown in FIG. 1, the content is delivered from content source 1-401 to base stations 1-201, 1-202, and 1-203 using IP multicast routing protocol via IMRP enabled routers (e.g., 1-301 and 1-302). However, IMRP protocols are usually not supported over the entire backhaul network. For example, FIG. 1 shows router 1-303 which does not have IMRP link functionality. Thus, undesired inefficiencies are introduced into the system of FIG. 1.

Furthermore, the above mentioned multicast broadcast services (MBS) are not currently defined for Network Multi-Input, Multi-Output (NMIMO) or cooperative multi point (CoMP) systems. However, this is likely to be the next area of activity in standardization and technology innovation.

As described above, the conventional art provides a system which relies on inter-base station synchronization and IMRP support over the backhaul network, which causes increased cost, implementation delays, provisioning complexity.

SUMMARY

At least one example embodiment relates to methods and/ or devices for obtaining a single frequency network in a communications network.

According to at least one example embodiment, a method for wireless communication includes receiving, by a network controller, broadcast content from at least one content source. The method includes synchronizing, by the network controller, with at least a first and second base station. The at least first and second base stations may be associated with the network controller. The method may also include transmitting, by the network controller, the broadcast content to the at least first and second base stations based on the synchronization such that the broadcast content is transmitted from the at least first and second base stations at desired times.

According to at least one example embodiment, the receiving includes receiving the broadcast content by internet protocol (IP) unicast routing.

According to at least one example embodiment, the receiving further includes receiving the broadcast content by IP multicast routing.

According to at least one example embodiment, the desired times are a same time.

According to at least one example embodiment, the receiving and the transmitting the broadcast content are over a backhaul network.

According to at least one example embodiment, the transmitting the broadcast content occurs over a digitized radio frequency (RF) link of the backhaul network.

According to at least one example embodiment, the synchronizing includes transmitting a first signal to the at least first and second base stations. The synchronizing also includes receiving a second signal from each of the at least first and second base stations, the second signal being generated in response to the first signal. The synchronizing further includes measuring delays between the transmitting the first signal and the receiving of each of the second signals. The synchronizing further includes adjusting a time of transmission of the broadcast content to the at least first and second base stations based on the measured delays.

According to at least one example embodiment, the transmitting the broadcast content includes transmitting the broadcast content based on the adjusting.

According to at least one example embodiment, the adjusting includes at least one of advancing and delaying the transmission time of the broadcast content to the first and second base stations.

According to at least one example embodiment, a device for wireless communications network includes a network controller configured to implement the above described method.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments.

DETAILED DESCRIPTION OF EXAMPLE EMBODIMENTS

Figure 1:
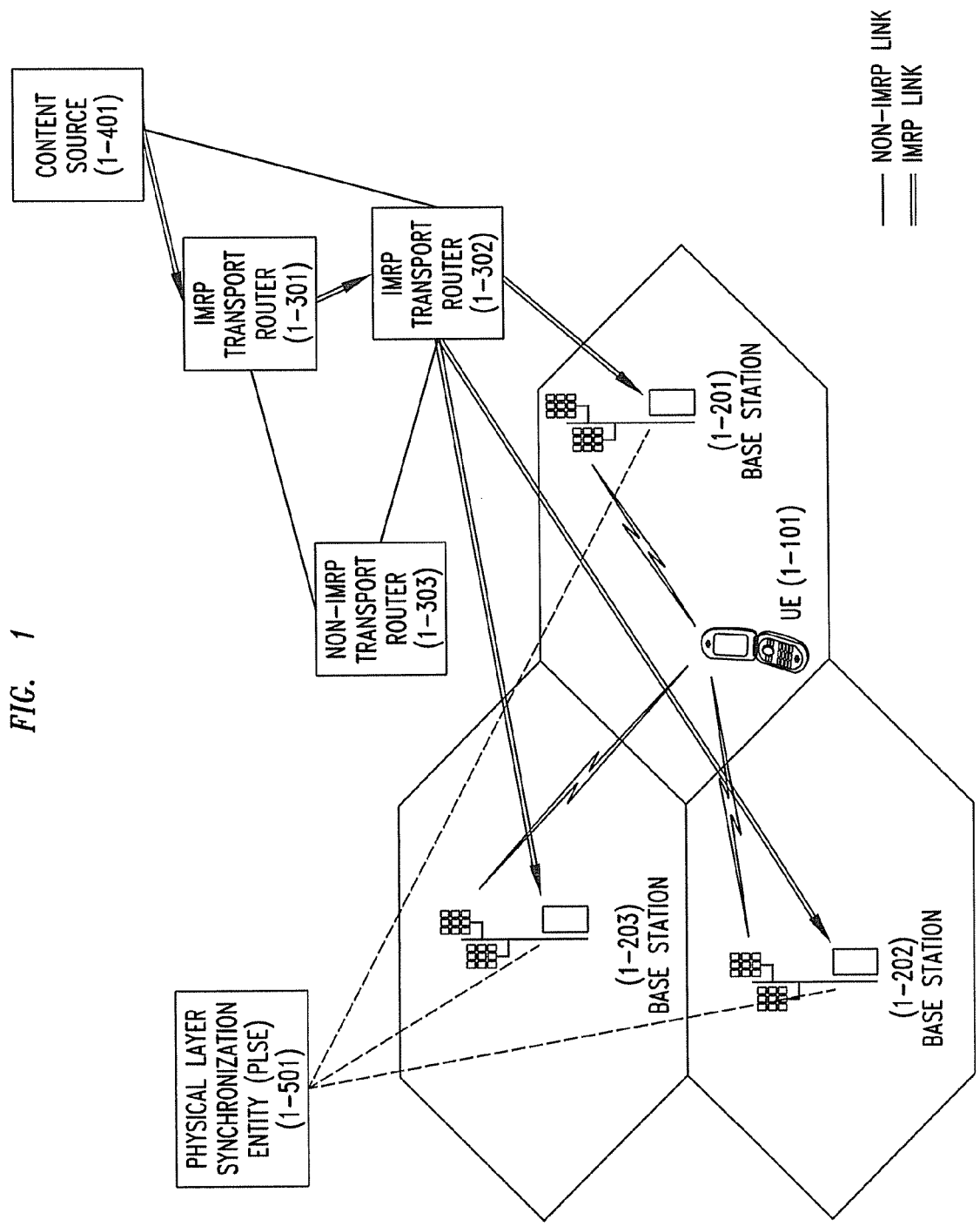
FIG. 1 is a diagram illustrating a wireless communications system according to the conventional art.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs, eNodeBs, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Figure 2:
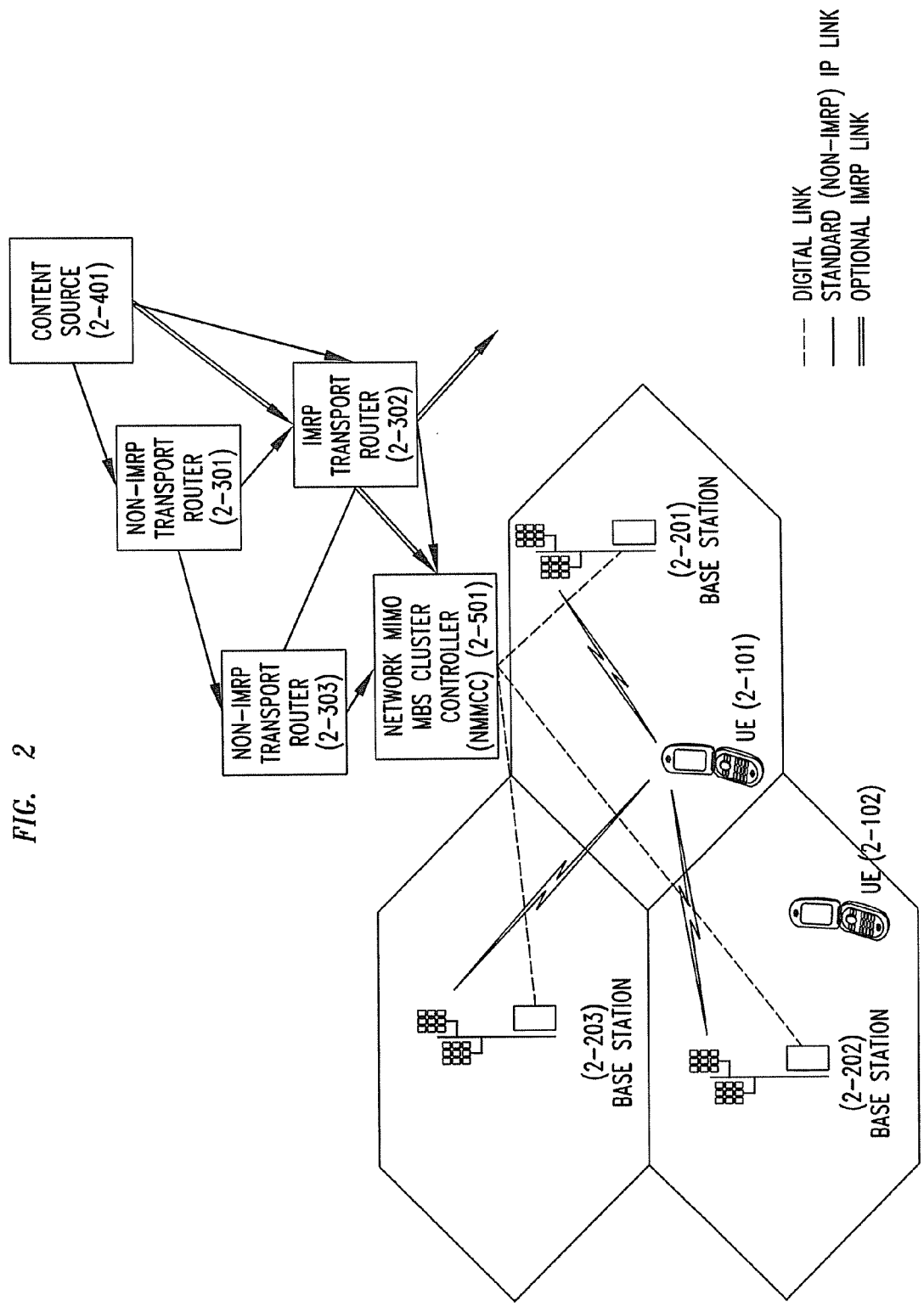
FIG. 2 is a diagram illustrating a wireless communications system according to at least one example embodiment.

FIG. 2 is a diagram illustrating a wireless communications system according to at least one example embodiment. It should be understood that FIG. 2 may employ, for example, Long Term Evolution (LTE) wireless standards and network elements configured for LTE standards. However example embodiments are not limited thereto, and may employ other wireless standards.

FIG. 2 shows a wireless communications system that includes a content source 2-401, transport routers 2-301, 2-302, and 2-303, base stations 2-201, 2-202, and 2-203, and user equipment 2-101 and 2-102. Although not explicitly shown, it should be understood that the wireless communications system of FIG. 2 is not limited thereto. For example, it should be understood that a communications system according to at least one example embodiment could include additional routers, base stations, content sources, and user equipment. According to at least one example embodiment, the wireless communications system implements a network multi-input, multi-output (NMIMO) architecture and multicast broadcast services (MBS) architecture. The NMIMO and MBS architectures are well known within the art, and as such, detailed descriptions of these architectures are omitted from this description for the sake of brevity. At least one example embodiment is directed to integrating the NMIMO architecture with MBS functionality using a new network element, shown in FIG. 2 as NMIMO MBS cluster controller (NM-MCC) 2-501 (hereinafter, "network controller 2-501"). Although not explicitly shown, it should be understood that the wireless communications system could include multiple network controllers 2-501 in communication with one another.

As shown in FIG. 2, the content source 2-401 may transmit content (e.g., digital audio/video content specific to a UE or common to all UEs) to network controller 2-501 via transport routers 2-301, 2-302, and 2-303. The transport routers 2-301, 2-302, and 2-303 may support a standard link (e.g., using a non IP multicast routing protocol (non-IMRP)) and/or an optional link (e.g., using IMRP).

The NMIMO and MBS architectures both require synchronization across the cluster of base stations 2-201, 2-202, and 2-203. According to at least one embodiment, the network controller 2-501 implements NMIMO synchronization capabilities because the NMIMO architecture conforms to more stringent synchronization conditions than the MBS architecture. Thus, integrating MBS functionality into the NMIMO architecture using the network controller 2-501 assures a more than acceptable level of synchronization with the base stations 2-201, 2-202, and 2-203. Synchronization will be described in more detail below with reference to FIGS. 4A and 4B. In addition to synchronizing with the base stations, the network controller 2-501 may also provide joint signal processing (including antenna weights), scheduling, and/or content delivery to each of the base stations 2-201, 2-202, and 2-203 that support of both unicast and broadcast services.

In FIG. 2, the network controller 2-501 synthesizes and transmits MBS signals (i.e., signals containing the digital audio/video content from content source 2-401) to each base station 2-201, 2-202, and 2-203. For example, the network controller 2-501 transmits the MBS signals using a digital link with base stations 2-201, 2-202, and 2-203. As is well known in the art, there are various methods for communicating the signals from the network controller 2-501 to base stations 2-201, 2-202, and 2-203. For example, one well-known method involves I/Q modulation using the baseband processing unit within the network controller 2-501. These modulated signals may be transmitted digitally (e.g., over a hardwired backhaul network). Another well-known method may involve up converting the signal to the intended radio frequency (RF) carrier, digitized, and transmitted over a suitable digital media. Still another method may include directly modulating the RF carrier and transmitting the signal over an optical connection. In this application, it should be understood that the phrase "digitized radio frequency (RF) link" refers to the above methods of transmitting signals between the network controller 2-501 and base stations 2-201, 2-202, and 2-203 without any loss of generality.

As one of ordinary skill in the art may appreciate, the system of FIG. 2 provides improvements not achieved by the system of FIG. 1. In FIG. 1, the base stations 1-201, 1-202, and 1-203 themselves synthesize and transmit the MBS signal to a UE. Base stations 1-201, 1-202, and 1-203 are synchronized with each other with the aid of PLSE 1-501. Thus, a system according to FIG. 1 utilizes a specialized entity (i.e., PLSE 1-501) which introduces undesired complexity into the system.

In a system according to FIG. 2, however, MBS signals are transmitted over a digitized RF link by a single entity, network controller 2-501. In FIG. 2, the network controller 2-501 takes into account that, in a MBS single frequency network (MBSFN) transmission, the broadcast content bearing resource elements (RE) are identical across the participating base stations 2-201, 2-202, and 2-203 and the MBSFN reference symbols are identical. Thus, the MBS signals transmitted from network controller 2-501 is already identical and synchronized across the base stations 2-201, 2-202, and 2-203. Accordingly, base stations 2-201, 2-202, and 2-203 receive MBS signals that already have SFN characteristics (unlike the base stations in FIG. 1). In FIG. 2, the network controller 2-501 is the source of the MBSFN signal, and the base stations 2-201, 2-202, and 2-203 are merely wireless transmission points for the MBSFN signal. As one of ordinary skill in the art may appreciate, a communications system according to FIG. 2 may considerably simplify the MBSFN operation and base station synchronization. Further, the system of FIG. 2 may improve synchronization by reducing (or alternatively, eliminating) both inter-base station and intra-base station synchronization problems that affect the conventional art.

Another advantage of architecture presented in FIG. 2 stems from a case where content is intended to be locally broadcast. In case the intended broadcast area is localized to the cluster of base stations covered by one network controller 2-501, then IMRP is not required or ideal because the content source 2-401 may transmit the content to the network controller 2-501 more efficiently using a non-IMRP, normal IP link (e.g., a unicast transmission) since the transmission is point-to-point from the content source 2-401 to the network controller 2-501. Even where a MBSFN serving area covers multiple network controllers 2-501 to which the same content needs to be transmitted to, there are usually far fewer network controllers 2-501 than there are base stations. Thus, a non-IMRP link may still be appropriate in these cases. Accordingly, a system according to FIG. 2 that employs non-IMRP links between the content source 2-401 and the network controller 2-501 may facilitate flexibility and ease of implementation of a backhaul network.

Figure 3:
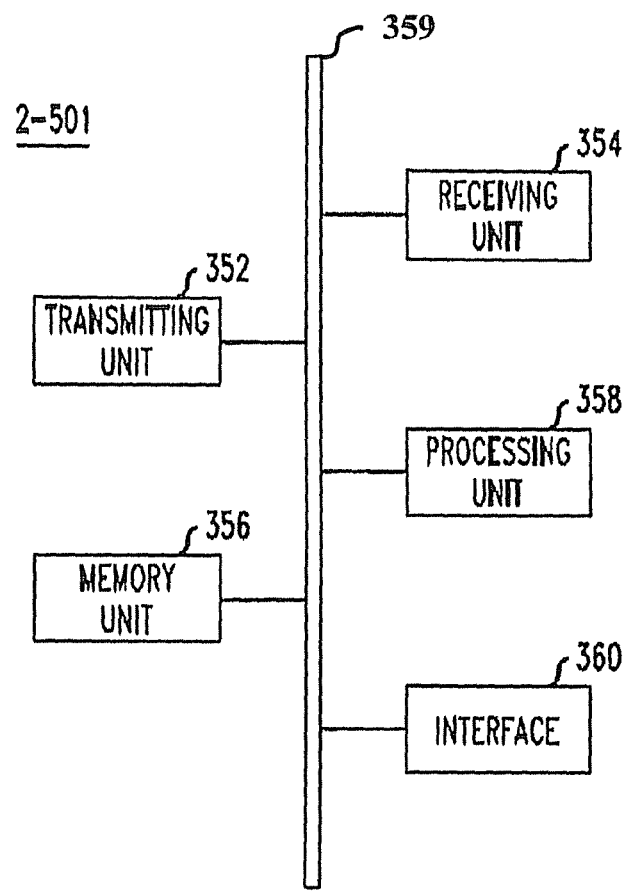
FIG. 3 is a diagram illustrating an example structure of a network controller according to at least one example embodiment.

FIG. 3 is a diagram illustrating an example structure of a network controller according to at least one example embodiment. For example, FIG. 3 shows an example structure of the network controller 2-501 from FIG. 2.

According to at least one example embodiment, a network controller 2-501 may be configured for use in a communications network (e.g., a wireless network according to LTE standards). Referring to FIG. 3, the network controller 2-501 may include, for example, a data bus 359, a transmitting unit 352, a receiving unit 354, a memory unit 356, a processing unit 358, and an interface 360.

The transmitting unit 352, receiving unit 354, memory unit 356, processing unit 358, and interface 360 may send data to and/or receive data from one another using the data bus 359. The transmitting unit 352 is a device that includes hardware and any necessary software for transmitting signals including, for example, data signals, control signals, and signal strength/quality information via one or more wireless and/or wired connections to other network elements in a communications network. For example, the transmitting unit 352 may transmit signals to base stations 2-201, 2-202, and/or 2-203 in FIG. 2.

The receiving unit 354 is a device that includes hardware and any necessary software for receiving signals including, for example, data signals, control signals, and signal strength/quality information via one or more wireless and/or wired connections to other network elements in a communications network. For example, the receiving unit 354 may receive signals from base stations 2-201, 2-202, and/or 2-203 in FIG. 2.

The memory unit 356 may be any device capable of storing data including magnetic storage, flash storage, etc.

The processing unit 358 may be any device capable of processing data including, for example, a microprocessor configured to carry out specific operations based on input data, or capable of executing instructions included in computer readable code. For example, it should be understood that the modifications the methods described with reference to FIGS. 2, 4A and 4B, may be stored on the memory unit 356 and implemented by the processing unit 358 within network controller 2-501.

The interface 360 is a device that includes hardware and any necessary software for interfacing with network elements within a communications network. For example the interface 360 may receive and/or transmit data signals, control signals, and/or other signals to and from transport routers 2-301, 2-302, and 2-303 and base stations 2-201, 2-202, and/or 2-203 in FIG. 2 via one or more wireless and/or wired connections.

Figure 4A:
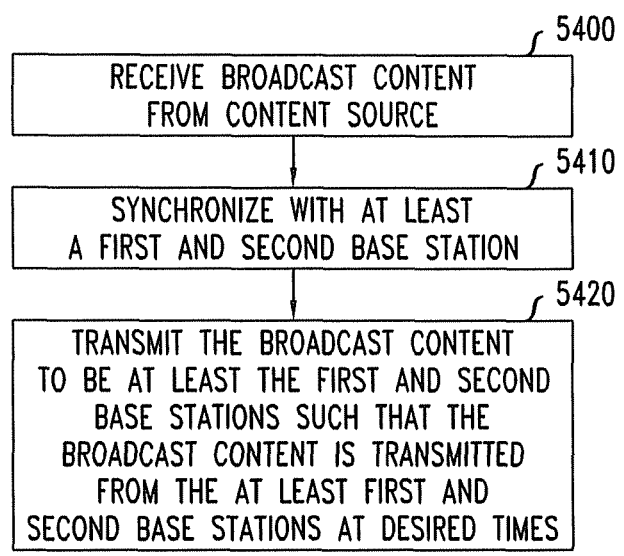
FIGS. 4A and 4B are flow diagrams illustrating example operations of the network controller in FIGS. 2 and 3, according to at least one example embodiment.
Figure 4B:
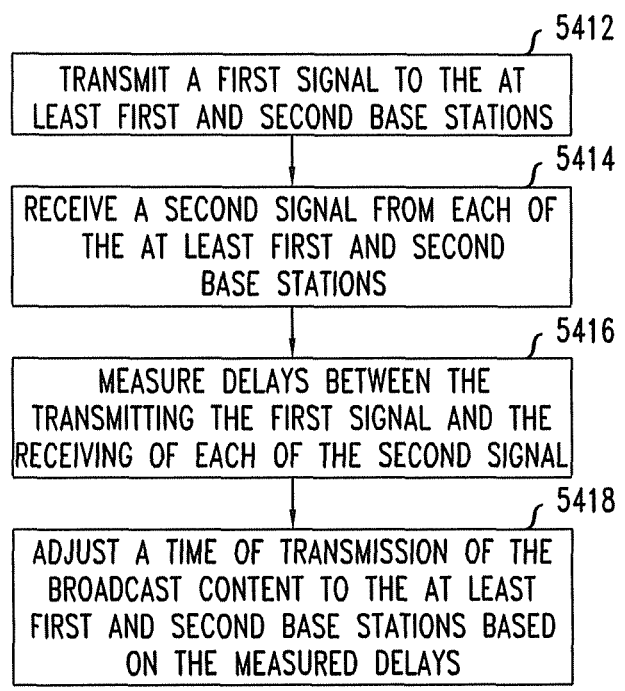

Further, it should be understood that the modifications and methods described in FIGS. 2, 4A, and 4B may be carried out by one or more of the above described elements of the network controller 2-501. For example, the receiving unit 354 and/or the interface 360 may carry out steps of "receiving," "acquiring," "obtaining," and the like; transmitting unit 352 and or the interface 360 may carry out steps of "transmitting," "outputting," and the like; processing unit 358 may carry out steps of "determining," "generating", "correlating," "calculating," "synchronizing" and the like; and memory unit 356 may carry out steps of "storing," "saving," and the like.

FIGS. 4A and 4B are flow diagrams illustrating an example operation of the network controller of FIGS. 2 and 3. Accordingly, FIG. 4 is described with reference to FIGS. 2 and 3.

As shown in step S400, a network controller may receive broadcast content from at least one content source. The network controller may correspond to, for example, the network controller 2-501 shown in FIGS. 2 and 3. The at least one content source may correspond to, for example, content source 2-401 in FIG. 2. The broadcast content may be, for example, digital audio/video content intended for user equipment UE 2-101 in FIG. 2. According to at least one example embodiment, the network controller 2-501 may receive the broadcast content by only internet protocol (IP) unicast routing. Alternatively, the network controller 2-501 may receive the broadcast content by IP unicast routing and IP multicast routing. Further, the network controller 2-501 may receive the broadcast content from the content source 2-401 over a backhaul network of the communications system in FIG. 2 via routers 2-301, 2-302, and/or 2-303.

In step S410, the network controller 2-501 may synchronize with at least a first and second base station. For example, the network controller 2-501 may synchronize with each of the base stations 2-201, 2-202, and 2-203 shown in FIG. 2. As shown in FIG. 2, base stations 2-201, 2-202, and 2-203 are associated with the network controller 2-501. Synchronization with the base stations is further described with reference to FIG. 4B.

In step S420, the network controller 2-501 may transmit the broadcast content to the first and second base stations (e.g., base stations 2-201, 2-202, and 2-203) based on the synchronization in step S410. For example, the network controller 2-501 may transmit the broadcast content to base stations 2-201, 2-202, and 2-203 such that the broadcast content is transmitted from base stations 2-201, 2-202, and 2-203 (e.g., antenna tips of base stations 2-201, 2-202, and 2-203) at desired times to achieve the desirable broadcast SFN characteristics of significantly improved SINR (signal-to-interference ratio) and improved channel diversity.

In one embodiment, the desired times are a same time. In other words, the network controller transmits the broadcast content to the base stations 2-201, 2-202, and 2-203 such that the broadcast content is transmitted from the base stations 2-201, 2-202, and 2-203 at a same time (e.g., the broadcast content is transmitted from antenna tips of base stations at a same time). In this way, base stations 2-201, 2-202, and 2-203 act as SFN transmission points for the broadcast content (i.e., base stations 2-201, 2-202, and 2-203 are relaying the broadcast content from network controller 2-501 to the UE 2-101 via a digitized RF link (which may be a wired or wireless link)—rather than processing the content and synchronizing before transmitting as in the conventional art of FIG. 1). It should also be understood that the network controller 2-501 is controlling the transmission of the broadcast content to the base stations such that the broadcast content is transmitted from antennas of the base stations at desired times. This reduces (or alternatively, eliminates) the inter-base station and intra-base station timing issues of the conventional art, and as such, the broadcast content transmitted from each of base stations 2-201, 2-202, and 2-203 reaches all UEs 2-101 using SFN transmission.

FIG. 4B is a flow diagram illustrating an example synchronization operation of the network controller of FIGS. 2 and 3. For example, FIG. 4B shows more detail about step S410 in FIG. 4A.

In step S412, the network controller 2-501 may transmit a first signal to at least the first and second base stations (e.g., base stations 2-201, 2-202, and 2-203).

In step S414, the network controller 2-501 may receive a second signal from each of the at least first and second base stations. In step S414, the second signal is generated in response to the first signal. For example, the second signal is generated in immediate response to the first signal from each of the base stations 2-201, 2-202, and 2-203.

In step S416, the network controller 2-501 may measure delays between transmitting the first signal and receiving each of the second signals. For example, the network controller 2-501 may employ time stamps in order to measure the delays. However, example embodiments are not limited thereto. For example, the network controller 2-501 may measure the delays in any well-known manner.

In step S418, the network controller 2-501 may adjust a time of transmission of the broadcast content to the at least first and second base stations (e.g., base stations 2-201, 2-202, and 2-203) based on the measured delays. According to one embodiment, the network controller may adjust a time of transmission by at least one of advancing and delaying the transmission time of the broadcast content to the first and second base stations. Thus, in step S418, the network controller 2-501 may nullify and/or compensate for the differential delays from the network controller 2-501 to each of the antenna tips of the base stations 2-201, 2-202, and 2-203.

Accordingly, in step S420 from FIG. 4A, the network controller may transmit the broadcast content based on the adjusting from step S418 in FIG. 4B. For example, if the measured delay for base station 2-201 is 15 ms and the measured delay for base station 2-202 is 20 ms (i.e., base station 2-202 is further from network controller 2-501 than base station 2-201), then the network controller may advance the transmission of the broadcast content to base station 2-202 by 5 ms such that the content reaches the base stations 2-201 and 2-202 (e.g., antenna tips of base stations 2-201 and 2-202) at a same time. Alternatively, the network controller may delay the transmission of the broadcast content to base station 2-201 by 5 ms such that the content reaches the base stations 2-201 and 2-202 (e.g., antenna tips of base stations 2-201 and 2-202) at a same time.

As one of ordinary skill in the art may appreciate, a wireless communications system according an example embodiment may considerably simplify the MBSFN operation and base station synchronization using the network controller for NMIMO/CoMP, as described above since the controller function for both the NMIMO/CoMP and MBS are integrated in one unit 2-501. Further, the network controller for NMIMO/CoMP according to at least one example embodiment may improve synchronization by reducing (or alternatively, eliminating) inter-base station and intra-base station synchronization problems.

Further, in case content is intended to be locally broadcast, a system according to at least one example embodiment may employ only a non-IMRP link between a content source the network controller, which may facilitate flexibility and ease of implementation of a backhaul network of the communications system.

Variations of the example embodiments are not to be regarded as a departure from the spirit and scope of the example embodiments. All such variations as would be apparent to one skilled in the art are intended to be included within the scope of this disclosure.

What is claimed is:

1. A method for a communications network, comprising:
    receiving, by a network controller, broadcast content from at least one content source;
    synchronizing, by the network controller, with at least a first and second base station, the at least first and second base stations being associated with the network controller, the synchronizing including determining times of transmission of the broadcast content to the at least first and second base stations; and
    transmitting, by the network controller, the broadcast content to the at least first and second base stations at the determined times such that the broadcast content is transmitted from the at least first and second base stations at desired times, wherein the determining times of transmission includes,
    transmitting a first signal to the at least first and second base stations,
    receiving a second signal from each of the at least first and second base stations, the second signal being generated in response to the first signal,
    measuring delays between the transmitting the first signal and the receiving of each of the second signals, and
    adjusting the times of transmission of the broadcast content to the at least first and second base stations based on the measured delays.

2. The method of claim 1, wherein the receiving includes receiving the broadcast content by internet protocol (IP) unicast routing.

3. The method of claim 2, wherein the receiving further includes receiving the broadcast content by IP multicast routing.

4. The method of claim 1, wherein the receiving and the transmitting the broadcast content are over a backhaul network.

5. The method of claim 4, wherein the transmitting the broadcast content occurs over a digitized radio frequency (RF) link of the backhaul network.

6. The method of claim 1, wherein the transmitting the broadcast content includes transmitting the broadcast content based on the adjusting.

7. The method of claim 1, wherein the adjusting includes at least one of advancing and delaying the transmission time of the broadcast content to the first and second base stations.

8. A device for a communications network, comprising:
    a network controller configured to,
        receive broadcast content from at least one content source,
        synchronize with at least a first and second base station by determining times of transmission of the broadcast content to the at least first and second base stations, the at least first and second base stations being associated with the network controller, and
        transmit the broadcast content to the at least first and second base stations at the determined times such that the broadcast content is transmitted from the at least first and second base stations at desired times,
    wherein, in order to determine the times of transmission, the network controller is configured to,
        transmit a first signal to the at least first and second base stations,
        receive a second signal from each of the at least first and second base stations, the second signal being generated in response to the first signal,
        measure delays between the transmitting the first signal and the receiving of each of the second signals, and
        adjust the times of transmission of the broadcast content to the at least first and second base stations based on the measured delays.

9. The device of claim 8, wherein the network controller is configured to receive the broadcast content by internet protocol (IP) unicast routing.

10. The device of claim 9, wherein the network controller is further configured to receive the broadcast content by IP multicast routing.

11. The device of claim 8, wherein the network controller is configured to receive and transmit the broadcast content over a backhaul network.

12. The device of claim 11, wherein the transmitting the broadcast content occurs over a digitized radio frequency (RF) link of the backhaul network.

13. The device of claim 8, wherein the network controller is configured to transmit the broadcast content based on the adjusting.

14. The device of claim 8, wherein the network controller is configured to adjust a time of transmission by at least one of advancing and delaying the transmission time of the broadcast content to the first and second base stations.

* * * * *